United States Patent Office 3,316,219
Patented Apr. 25, 1967

3,316,219
PROCESS FOR THE PRODUCTION OF HIGH MOLECULAR WEIGHT POLYOXYMETHYLENES
Kuno Wagner and Ernst-Ulrich Köcher, Leverkusen, Germany, assignors to Farbenfabriken Bayer Aktiengesellschaft, Leverkusen, Germany, a German corporation
No Drawing. Filed Sept. 23, 1963, Ser. No. 310,896
Claims priority, application Germany, Oct. 13, 1962,
F 38,025
3 Claims. (Cl. 260—67)

The invention relates to a process for the production of high molecular weight polyoxymethylenes by polymerizing formaldehyde using compounds of divalent tin as catalysts.

It is known that practically anhydrous, highly purified formaldehyde having a water content of less than 0.05% can be polymerized to yield high molecular weight polyoxymethylenes with the aid of numerous catalysts such as boron trifluoride, oxonium salts, tertiary and quaternary nitrogen bases, metal salts, metal alcoholates, organometal compounds, sulphonium salts, phosphonium salts etc. in inert solvents. It is further known to polymerize formaldehyde gases having a relatively high water content to yield high molecular weight polyoxymethylenes with the aid of special catalysts. In this case, impure formaldehyde having a water content of about 0.5 to 5% is introduced into an inert organic solvent, or into a solvent which has an acylating or alkylating action or alternatively it is added to high molecular weight polyoxymethylenes in the absence of solvents, and special catalysts, preferably compounds of divalent tin, are added to the polymerization reactants. With this method, it is possible to retard considerably the chain breaking reactions caused by water and other impurities, with the result that high quality polyoxymethylenes having internal viscosities of about 0.6 to 3 (measured in dimethylformamide or butyrolactone at 150° C. in 0.5% solution), which corresponds to average molecular weights of about 30,000 to 150,000 are obtained.

Among the various divalent tin compounds, it is mainly the divalent tin salts of organic carboxylic acids as well as freshly prepared, colloidal dissolved divalent tin hydroxides which have hitherto gained practical importance in the known processes for the polymerization of formaldehyde. In the case of many other divalent tin compounds, both inorganic and organic, it has not been possible to confirm the exceptional properties of the divalent tin radical as initiator in the polymerization of formaldehyde, so that one had to assume that the anion of the catalyst, i.e. mainly the acyl radicals of organic carboxylic acids, are of decisive importance for the various polymerization processes (chain starting, chain breaking and transfer reactions) in this polymerization reaction which is disturbed relatively little by water. Although these catalysts which can be prepared, for example from tin-II-chloride and which could hitherto not be used are very active polymerisation catalysts for highly purified formaldehyde, they can only give rise to the formation of paraformaldehyde-like polyoxymethylenes in the polymerization of formaldehyde vapours which contain water. It has been found that the reason why numerous divalent tin compounds cannot be used in the processes of the said prior patents is that divalent tin compounds prepared from tin-II-chloride generally contains small quantities of halogen compounds which are liable to dissociate as well as certain amounts of soluble alkali metal salts and relatively large proportions of compounds of tetravalent tin. The increased proportion of tin-IV-compounds may be attributed to the fact that the tendency of divalent tin to oxidise has hitherto not been sufficiently taken into account in the preparation of the catalysts. The first two impurities mentioned seriously impair the polymerization process even when present only to the extent of a few milligrams per litre of polymerization medium, and the third impurity, namely the tin-IV-compounds, also considerably reduce the catalytic action of the catalyst when present to an extent of more than 10% calculated on the divalent tin. The chain breaking reactions caused by the said impurities have the effect that the good properties of the divalent tin catalysts, namely their ability to produce a rapid onset of polymerization with a relatively strongly retarded chain breaking reaction, are completely masked by the influence of the impurities.

The object of this invention is a process for the production of high molecular weight polyoxymethylenes by the polymerization of formaldehyde which contains impurities. In said process divalent tin compounds of the general formula

are used as catalysts. In this formula, R represents the radical of an N-substituted dithiocarbaminic acid, a xanthogenic acid, a carbonic acid semi-ester or an N-substituted carbamidic acid.

The process may be carried out by polymerizing gaseous formaldehyde containing impurities such as 0.5 to 3% water in inert solvents, in acylating agents, in alkylating agents or in the gaseous phase over large surfaces, e.g. over polyoxymethylene, at atmospheric pressure, elevated pressure or pressures below 760 mm. Hg, if desired with the addition of inert gases such as nitrogen or inert vapours of organic liquids such as toluene, in the presence of catalytic quantities of the divalent tin compounds.

Examples of tin compounds of dithiocarbaminic acid

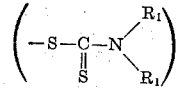

carrying two organic radicals (R) on the nitrogen atom, which may be used as catalysts according to the invention, are the tin salt of N:N-dibutyldithio-carbaminic acid, the tin salt of N-methyl-N-stearyl-dithiocarbaminic acid and the tin salt of N:N-diphenyl-dithiocarbaminic acid. An example of a xanthogenic acid compound

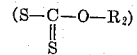

is the divalent tin salt of glycol monomethyl ether-dithiocarbonic acid. Examples of carbonic acid ester compounds

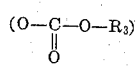

and of carbamidic acid compounds

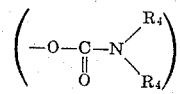

are the divalent tin salt of monomethyl ether carbonic acid and tin N:N-dibutylcarbamidate.

With the aid of these new divalent tin catalysts which have an elevated degree of purity, it is possible to use relatively impure formaldehyde for the polymerization, for example that obtained in the pyrolysis of formaldehyde or α-polyoxymethylene, without carrying out any intermediate purification for example by freezing, preliminary polymerization or other measures, and this impure formaldehyde can thus be converted into high molecular weight polyoxymethylenes, having valuable technological properties. As already indicated above, this finding is surprising because when the same catalysts have halogen contents of only 0.5% alkali contents of only 0.3% and tetravalent tin contents of 15 to 20% and they are used in the polymerization, in many different polymerization media, of formaldehyde vapours obtained by the decomposition of paraformaldehyde, only very low molecular weight polyoxymethylenes are obtainable. It has been found that divalent tin compounds which contain small proportions of Sn–Cl groups, e.g. in the form of

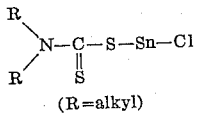

(R=alkyl)

have a particularly disturbing effect on the polymerization because in this case the chain breaking reactions due to water and other impurities proceed much more rapidly and therefore prevent the formation of high molecular weight polyoxymethylenes.

These catalysts at the same time provide increased protection against oxidation reactions and lead to products which have a reduced ash content (often due to $SnO_2$) after they have been acetylated or etherified, with the result that the thermostability of the polyoxymethylenes which have been stabilized in the end groups is increased.

To carry out the process according to the invention it is preferable to work with formaldehyde vapours which contain about 0.5 to 1% water and about 0.3% methanol. A formaldehyde with this degree of impurity can be prepared in a simple manner for example by the pyrolysis of paraformaldehyde having a water content up to 1%, with or without heat transfer agents. The gases obtained by pyrolysis are then introduced into the polymerization vessel at temperatures of about 90 to 150° C., if desired at reduced or elevated pressure, care being taken to avoid any preliminary polymerization. A good source for the preparation of formaldehyde vapours which contain methanol and have a low water content are formaldehyde gases which have been obtained in the dehydrogenation of methanol in the absence of hydrogen acceptors. Sometimes it is desirable to free such gases from traces of coloured, easily volatile unknown substances by washing them in solvents heated above 90° C. and sometimes relatively high proportions of fumaric acid must be removed by suitable measures, and again any preliminary polymerization must be avoided by using sufficiently high temperatures.

In the polymerization process according to the invention, it is important to introduce the formaldehyde gradually into the polymerization medium and to stimulate polymerization continuously by adding fresh catalyst. This increases the yield of high molecular weight polyoxymethylene. The polymerization is generally carried out with 0.000015 to 0.01 mol, preferably 0.0001 to 0.002 mol of catalyst per mol of formaldehyde if the process is carried out in inert or alkylating solvents. If, on the other hand, the polymerization is carried out in acetic anhydride or some other acylating agent, it is advantageous to use much higher concentrations, namely 0.001 to 0.006 mol of catalyst per mol of formaldehyde. Moreover, in the polymerization in acetic anhydride, it is advantageous to use formaldehyde vapours which have a water content of less than 1% because otherwise the free acetic acid formed in the course of polymerization will have an increasingly disturbing chain breaking effect.

The catalysts are preferably used in the form of 0.01 to 1% solutions in inert, acylating or alkylating solvents, for example in methylene chloride, 1,2-dichloropropane, or carbon tetrachloride or in aromatic hydrocarbons such as toluene, ethyl acetate, acetic anhydride, orthoformic acid ethyl ester or formaldehyde dimethylacetal. The addition of catalyst should be distributed as evenly as possible over the whole polymerization time. The rate of addition of catalyst is, of course, variable and will depend on the flow velocity at which the formaldehyde is introduced into the polymerization vessel. In a batchwise method for example it is advantageous to introduce 30 to 70% of the required catalyst solution at the beginning and then to add the remaining quantity in the course of the polymerization time by means of a dosing pump. It is important to dose the catalyst accurately and continuously because formaldehyde having for example a degree of impurity of 2.5% water and 0.1 to 0.3% fumaric acid introduces impurities which themselve shave a catalytic action. However, owing to the many times greater activity of divalent tin compounds, this catalytic activity has no significant effect provided the tin compounds are present in sufficient concentration in the polymerization reaction.

If the polymerization is carried out in an inert solvent, aromatic, araliphatic, cycloaliphatic and/or aliphatic hydrocarbons or their halogenation products may be used as solvents. However, it is preferable to work with methylene chloride because this is an excellent solvent for the low molecular weight formaldehyde hydrates which are formed and because this solvent can be prepared in a very high degree of purity. It is also possible to use solvents such as 1,3-dichloropropane. Carbon tetrachloride and chloroform may also be used for the polymerization provided they are sufficiently free from hydrogen chloride and phosgene.

To carry out the polymerization in an acylating agent, it is preferable to use acetic anhydride, if desired mixed with other solvents. However, other acylating agents may also be used.

If polymerization is carried out in an alkylating agent, it is preferable to use acid ethyl orthofumarate as solvent. The quantity of solvent used may vary within wide limits. It is generally advisable to use about 7 to 12 parts by volume of solvent to 1 part by weight of formaldehyde. The catalyst is generally dissolved in the same solvent in which the polymerization is carried out.

The polymerization can be carried out in a temperature range of −120 to +150° C. It is often advantageous to work at temperatures between −20 and +90° C.

The flow velocity at which the formaldehyde vapours are passed over or introduced into the polymerization vessel is variable and depends on the speed of pyrolysis as well as on the temperature conditions in the polymerization vessel.

If the polymerization has been carried out in inert solvents, the polymer is separated from the solvent by filtration or centrifuging. The process may be carried out continuously or semicontinuously. Fresh solvent and fresh catalyst may be introduced into the polymerization vessel at the rate at which the polymer is removed.

If the polymerization has been carried out in an acylating solvent, acylating catalysts are added after polymerization is completed, and the temperature is raised above 100° C. in order to convert all the end groups and to remove residues of catalyst.

The great advantage of the process according to the invention compared with polymerization processes hitherto known is that formaldehyde having a relatively high water content can be polymerized to high molecular weight polyoxymethylenes, no purification of the formaldehyde vapours by preliminary polymerization being required, and therefore the difficult process of continuously removing preliminary polymers is also completely obviated. Another important advantage lies in the fact that impure formaldehyde which is used for the polymerization is easily accessible. Further advantages of the process according to the invention reside in the fact that catalyst residues are more easily removed from the high molecular weight polyoxymethylenes, whereby the thermostability and the colour properties of the polymers are improved, particularly after they have been worked up. Further advantages lie in the better possibility of chain control and the production of more easily worked up high molecular weight polyoxymethylenes.

The high molecular weight polyoxymethylenes produced by the process according to the invention and stabilized by the process indicated above may be worked up to high quality synthetic resins with or without the addition of other substances. Such substances are, for example, heat stabilizers, antioxidants, plasticizers, fillers, pigment dyestuffs, light protective agents, optical brighteners and the like.

In the following examples, the parts given for the solvents are parts by volume, the other parts are parts by weight.

Example 1

140 parts by weight of paraformaldehyde having a water content of 0.65% are decomposed at 124 to 140° C. in an inert heat transfer agent consisting of a hydrocarbon mixture with 12–18 carbon atoms (Mepasin) in a round bottomed flask. The hot formaldehyde vapours pass through a double walled tube of VA-steel heated with steam to about 100° C. and over a lid which is also heated with steam and which is equipped with a thermometer, stirrer and outflow tube, into a cylindrical reaction vessel. The reaction vessel has a cross-section of about 12 cm. and a capacity of 2000 cm.$^3$ and is connected with the hot lid through an insulating seal. The outlet of the heated VA inlet tube is about 2 cm. above the liquid level of the polymerization medium. The outlet tube of the heated lid is connected with a Woolf's flask which contains water as a covering and receiving liquid and which is secured against excess pressure by means of a small ascending tube. The polymerization medium consists of 1400 parts of pure methylene chloride having a water content of 0.02% and contains, as catalyst, 0.3 part by weight of the tin salt of N:N-diphenyldithiocarbaminic acid. A further 0.8 part by weight of the catalyst dissolved in methylene chloride is added dropwise at a uniform rate in the course of the polymerization. The catalyst was prepared by reacting 1 mol of divalent tin acetate, free from alkali and chloride, with 2 mols of N:N-diphenyldithiocarbaminic acid sodium by mixing the reaction components together with the exclusion of air, and the catalyst was dissolved in benzene, freed from sodium acetate and obtained in the form of a whitish yellow crystalline compound by introducing it dropwise into methanol. After working up and drying the polyoxymethylene at 40° C. in vacuo, a high molecular weight polymer is obtained in a yield of 104 parts by weight. After acetylation, this polymer has an internal viscosity of 1.35 (measured in butyrolactone in 0.5% solution at 150° C.).

Example 2

1500 parts by volume of methylene chloride were placed in a 2 litre vessel equipped with stirrer, and treated with 5 parts by volume of a catalyst solution consisting of 0.5 part by weight of tin-II-di-methoxyethyl carbonate and 20 parts by volume of methylene chloride. Impure formaldehyde gas prepared by pyrolysis of paraformaldehyde in a hydrocarbon mixture with 12–18 carbon atoms (Mepasin) was introduced, with stirring, and the temperature was maintained at 20 to 30° C. by external cooling means. At the same time, the remaining catalyst solution was slowly added dropwise. After 25 minutes, the mixture could no longer be stirred, owing to the fibrous polyoxymethylene formed. After separating by suction, washing with methylene chloride and drying in air, 80 parts by weight of polyoxymethylene were obtained, which was stabilized by acetylation. The yield obtained on acetylation was 90% of the quantity originally added. The acetylated product had an internal viscosity of $\eta_i=1.65$ measured in 0.5% butyrolactone solution at 150° C.

Preparation of the catalyst:

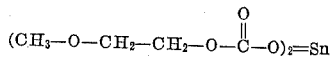

112 parts of SnCl$_2$—2H$_2$O were dissolved in 200 parts by volume of glycol monomethyl ether and treated with 200 parts by volume of benzene. The water was removed by azeotropic distillation.

This solution was added dropwise, with external cooling, to a solution of 23 parts by weight of sodium in 200 parts by volume of glycol monomethylether. After the reaction was completed, the precipitated sodium chloride was removed by suction and the filtrate was saturated with CO$_2$. The yellow solution of the tin-II-dimethoxyethyl carbonate so formed was then treated with 200 parts by volume of anhydrous toluene, concentrated to half the original volume and left to cool. The precipitated yellow crystals were filtered off by suction with the exclusion of air and moisture and washed with anhydrous toluene. To prevent any influence of moisture, the tin-II-methoxyethylcarbonate was kept in the form of a 50% paste moistened with toluene.

Example 3

The process is carried out as in Example 1, but the following tin-II-compounds are used as catalysts:

| Catalyst | Quantity of catalyst |
|---|---|
| (a) (CH$_3$—O—CH$_2$—CH$_2$—O—C(=S)—S)$_2$=Sn | 0.7 parts by weight |
| (b) (C$_4$H$_9$—NH—C(=O)—O)$_2$=Sn | 0.8 parts by weight dissolved in toluene |

Polyoxymethylenes having the following internal viscosity values are obtained in the following yields after acetylation:

| Experiment | Yield | Internal viscosity measured in butyrolactone at 150° C. in 0.5% solution |
|---|---|---|
| (a) | 80 parts by weight | 0.47 |
| (b) | 64 parts by weight | 0.51 |

Preparation of catalyst (a):

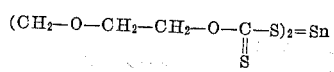

9.8 parts by weight of the sodium compound of glycol monomethylether and 100 parts by volume of anhydrous dioxane are treated with 7.6 parts by weight of carbon disulphide, with vigorous stirring. 20 parts by weight of a tin-II-salt of 2-ethylcaproic acid are added dropwise into the stirred mixture. After 8 hours, the mixture is stirred with 10 parts by weight of aluminium oxide, filtered, and the solution thereby freed from sodium salts and oily side products. After the removal of dioxane in a water jet vacuum, a yellowish syrupy tin-II-xanthogenate is obtained which has a very slight tendency to crystallize and which was used in this example, experiment (a) as catalyst.

Preparation of catalyst (b):

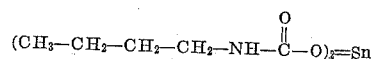

12.6 parts by weight of n-butyl carbaminic acid chloride are dissolved in 200 parts by volume of benzene. 7.6 parts by weight of a freshly prepared suspension of tin-II-hydroxide in dioxane are added, with thorough stirring, and the mixture is stirred together with a pearly, strongly basic ion exchanger which contains dimethylamino groups. The mixture is stirred for 18 hours at room temperature, filtered, again treated with 20 parts by weight of the strongly basic ion exchanger, and traces of hydrochloric acid are removed quantitatively. After renewed filtration, the benzene solution of the reaction product is freed from benzene in vacuo. A syrupy, slightly yellowish substance is obtained, which is used as catalyst in this example, experiment (b).

Example 4

The process is carried out as in Example 1 but the polymerization medium methylene chloride is replaced by the same quantity by volume of ethyl orthofumaric. Tin-(II)-N:N-diphenyldithiocarbaminate is used as polymerization catalyst in a quantity of 0.9 part by weight per 1000 parts by volume of ethyl orthofuramic. After working up the polymerization product as in Example 15 a high molecular weight polyoxymethylene is obtained in a yield of 98 parts by weight; after alkylation, this product has an internal viscosity of 1.3 (measured in butyrolactone at 150° C. in 0.5% solution).

Example 5

The process is carried out as in Example 1 but the following divalent tin compounds are used as catalysts:

| Experiment | Catalyst | Quantity | Polymerization medium |
|---|---|---|---|
| (a) | $(CH_3-(CH_2)_{11}-O-\underset{\underset{S}{\|}}{C}-S)_2=Sn$ | 1.3 | Acetic anhydride. |
| (b) | $\left(\begin{array}{c}C_4H_9 \\ \phantom{}\diagdown \\ N-\underset{\underset{}{\|}}{\overset{O}{\overset{\|}{C}}}-O \\ \phantom{}\diagup \\ C_4H_9\end{array}\right)_2=Sn$ | 0.9 | Toluene. |

Polyoxymethylenes having the following internal viscosities and yields are obtained after acetylation:

| Experiment | Yield | Internal viscosity, measured in butyrolactone in 0.5% solution at 150° C. |
|---|---|---|
| (a) | 109 parts by weight | 1.28 |
| (b) | 87 parts by weight | 0.91 |

Catalysts (a) and (b) are prepared by the method described in Example 3 under (a) and (b), using xanthogenic acid, from dodecyl alcohol or by using n-dibutylcarbaminic acid chloride.

What we claim is:
1. A process for producing high molecular weight polyoxymethylenes which comprises polymerizing gaseous formaldehyde containing 0.5 to 3% of water, up to 0.3% of methanol, and 0.1 to 0.3% of formic acid in the presence of 0.000015 to 0.01 mol per mol of formaldehyde of a compound of divalent tin of the formula

wherein R is a radical selected from the group consisting of

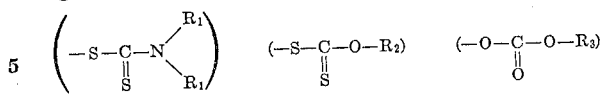

and

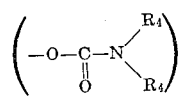

$R_1$ representing alkyl having from 1 up to 18 carbon atoms or phenyl, $R_2$ representing methoxyethyl or dodecyl, $R_3$ representing methoxyethyl and $R_4$ being selected from the group consisting of hydrogen and butyl, at least one $R_4$ being butyl, said polymerizing being effected at temperatures of about $-20$ to $+120°$ C., and recovering from the polymerization medium the resultant high molecular weight polyoxymethylene.

2. The process of claim 1 wherein said polymerization is carried out in an organic solvent selected from the group consisting of methylene chloride 1,2-dichloropropane, carbontetrachloride, toluene, ethyl acetate, acetic anhydride, the ethyl ester of orthoformic acid, and formaldehyde dimethyl-acetal.

3. The process of claim 1 wherein said polymerization is carried out in a fluidized bed of a high molecular weight polyoxymethylene.

References Cited by the Examiner

UNITED STATES PATENTS

| | | | |
|---|---|---|---|
| 2,848,437 | 8/1958 | Langsdorf et al. | 260—67 |
| 3,155,636 | 11/1964 | Kritzler et al. | 260—67 |
| 3,232,906 | 1/1966 | Wagner | 260—67 |

WILLIAM H. SHORT, *Primary Examiner.*

SAMUEL H. BLECH, *Examiner.*

L. M. MILLER, *Assistant Examiner.*